March 21, 1944.   J. D. SPALDING   2,344,746
DRIVE BUSHING
Filed April 14, 1941   3 Sheets-Sheet 1

Inventor
John D. Spalding
By Lyon & Lyon
Attorneys

March 21, 1944.　　J. D. SPALDING　　2,344,746
DRIVE BUSHING
Filed April 14, 1941　　3 Sheets-Sheet 2

Inventor
John D. Spalding
By Lyon & Lyon
Attorneys

March 21, 1944. J. D. SPALDING 2,344,746
DRIVE BUSHING
Filed April 14, 1941 3 Sheets-Sheet 3

Inventor
John D. Spalding
By Lyon & Lyon
Attorneys

Patented Mar. 21, 1944

2,344,746

UNITED STATES PATENT OFFICE 2,344,746

DRIVE BUSHING

John D. Spalding, Los Angeles, Calif.

Application April 14, 1941, Serial No. 388,555

5 Claims. (Cl. 255—23)

This invention relates to rotary drilling apparatus as used in drilling of wells and more particularly to the means provided for effecting a driving connection between the rotary machine and the kelly.

In a rotary drilling apparatus a kelly is used which is a tubular member non-circular in cross-section and provided at each end with an enlarged threaded joint. The enlarged end sections are provided to enable the joints to be formed of adequate strength. In a rotary machine there is provided a drive bushing adapted to contact the non-circular section of the kelly to transmit the drive from the rotary machine to the kelly. The kelly slides vertically through the drive opening in the drive bushing.

Because of the fact that the drive bushing must fit closely, the non-circular portion of the kelly, it is not possible to form the drive bushing as a one-piece or integral construction, as this would not permit the enlarged ends of the kelly to pass through the driving opening provided therein. It is therefore the practice in this art to form the drive bushings of split construction to permit the two halves to be assembled around the kelly at a position intermediate its ends.

Split drive bushings of this character have heretofore been held together in assembled relation by means of cross-bolts which span the joints between the two halves. This arrangement often produces an awkward construction as the size of the cross-bolts must be such as to withstand not only the large torque forces involved, but also the hammering and vibration to which the kelly drive bushing is subjected.

It is therefore an object of this invention to provide a Kelly drive assembly which is constructed to give in effect and in use a one-piece construction.

Another object of this invention is to provide a Kelly drive means including a driving means of split construction but wherein no cross-tie-bolts are employed.

Another object of this invention is to provide a Kelly drive device including two drive segments which are maintained in cooperative driving relation by means of a drive body and into which the drive segments are fitted in a tapered bore and wherein the drive body receives and transmits the drive from the rotary machine to the kelly through the split segments.

Another object of this invention is to provide a Kelly drive device of the type wherein the driving torque is transmitted from an integral member directly to each of the drive segments by means of driving lugs or keys operatively interposed between the integral member and the segments.

Another object of this invention is to provide a Kelly drive device of the type including an integral driving torque transmitting member and driving segments wherein means are provided for maintaining the integral member and the segments in operative relationship so as in effect to form a one-piece integral construction.

Other objects and advantages of this invention it is believed will be apparent from the following detailed description of a preferred embodiment thereof as illustrated in the accompanying drawings.

Figure 1:
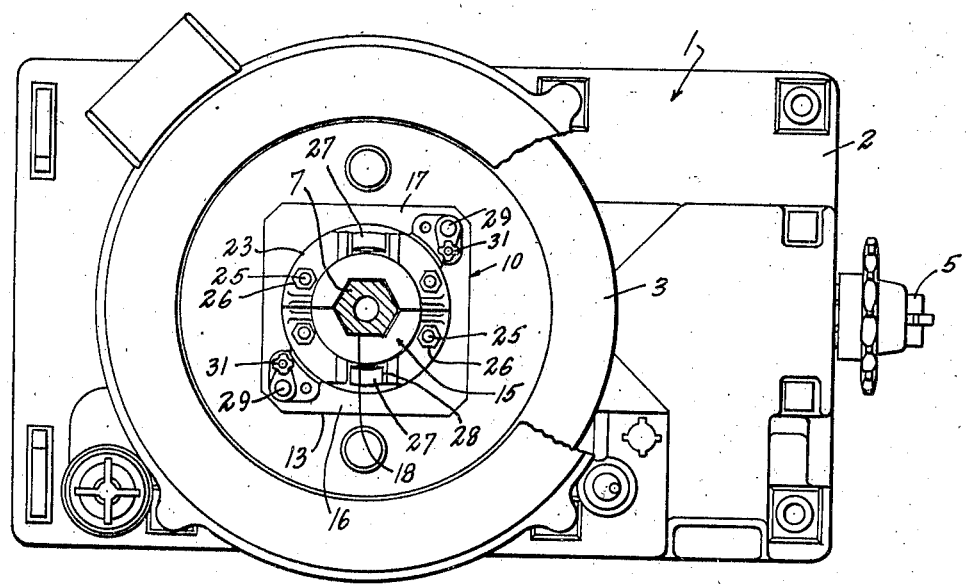
Figure 1 is a top plan view partly broken away of a rotary machine incorporating a drive bushing embodying my invention.
Figure 2:
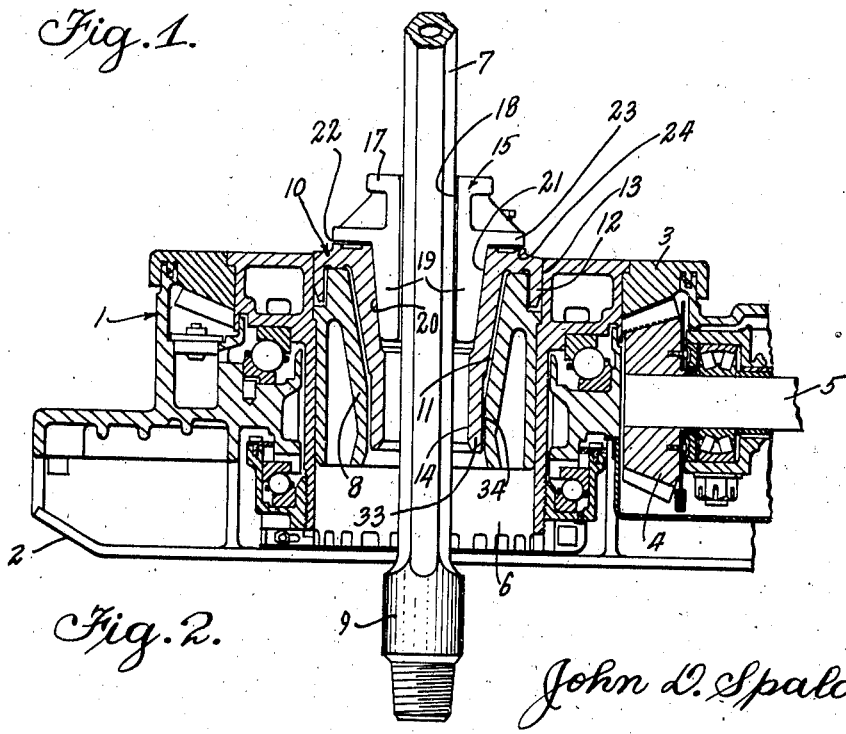
Figure 2 is an enlarged sectional side elevation partly broken away of the structure as illustrated in Figure 1.
Figures 3, 4, 5:
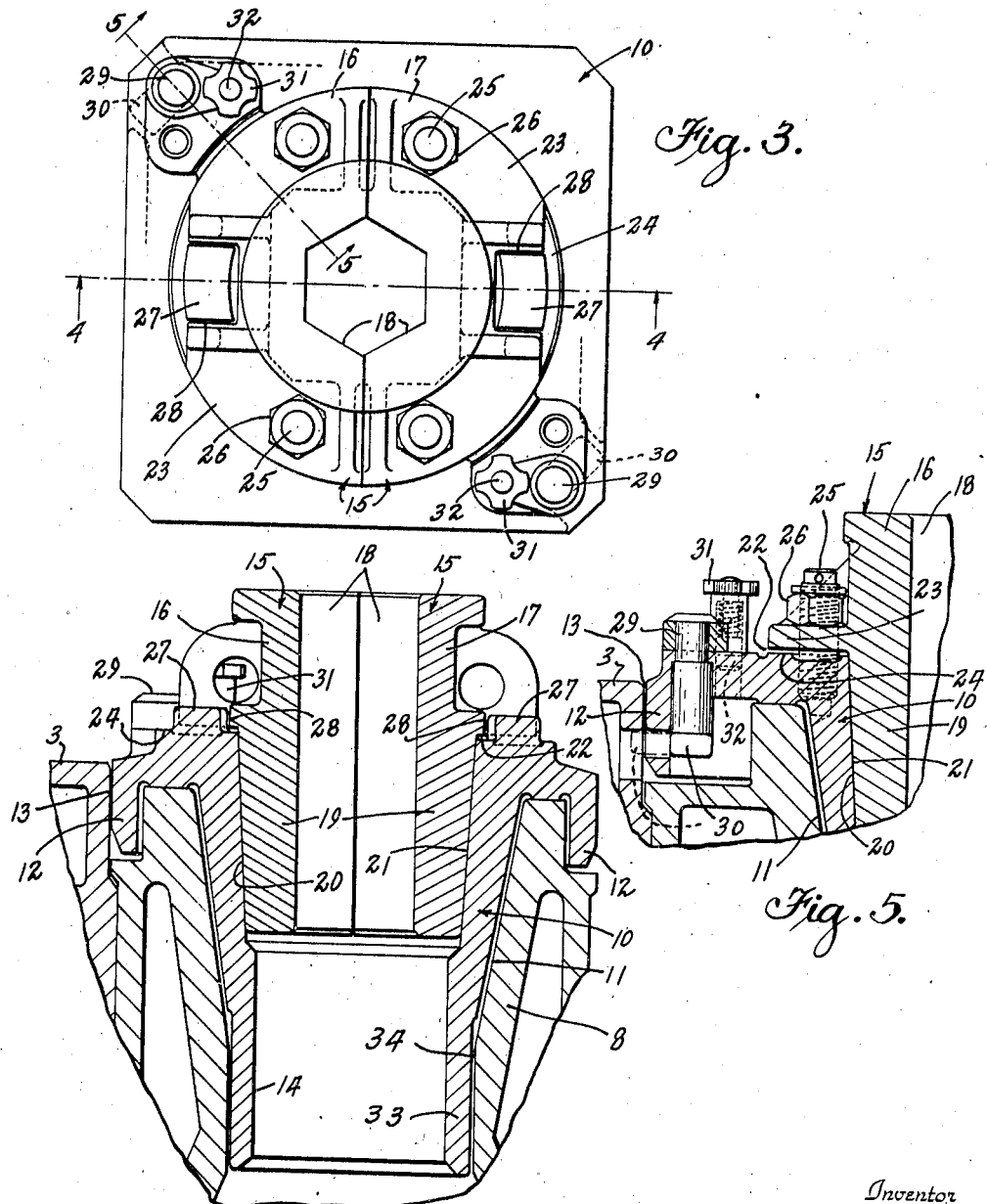
Figure 3 is an enlarged top plan view of the Kelly drive means embodied in my invention.
Figure 4 is a section view taken substantially on the line 4—4 of Figure 3, and illustrating the said drive means as associated with a fragment of the rotary machine also illustrated in section.
Figure 5 is a fragmental section elevation taken substantially on the line 5—5 of Figure 3.
Figure 6:
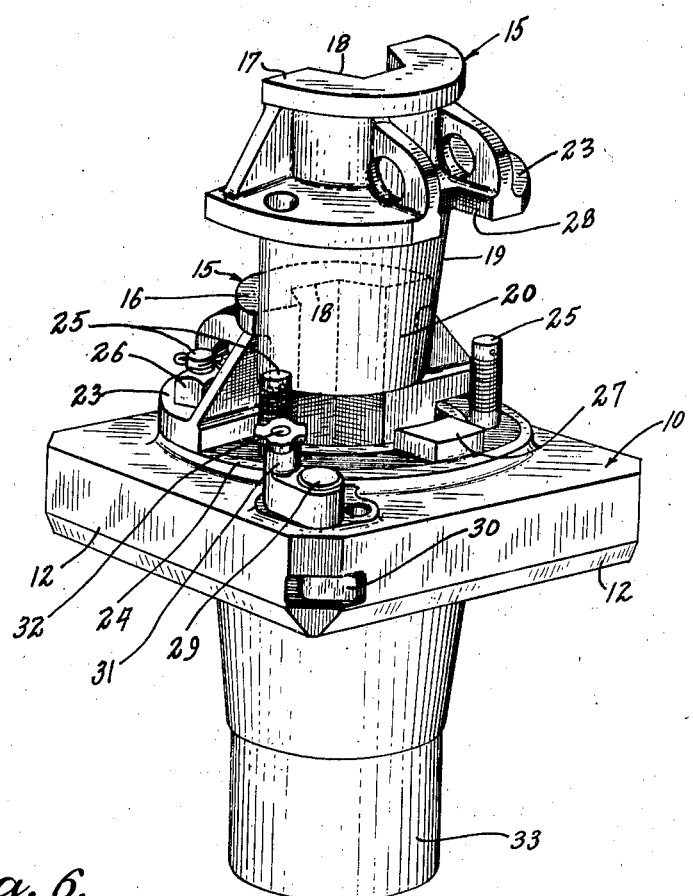
Figure 6 is a perspective view of the bushing assembly illustrating one of the drive bushing sections partially removed.

In the preferred embodiment of my invention as illustrated in the accompanying drawings, there is indicated a rotary machine 1, including a base 2 supporting a rotary table 3 driven by means of a pinion 4 mounted upon a drive shaft 5. The rotary table is provided with a central opening 6 through which the drill pipe (not shown) and kelly 7 are passed in the drilling of the well.

As is common in this art, a master bushing 8 is mounted in the rotary table opening to receive some form of drive means whereby a rotary drive may be imparted from the table 3 to the non-circular section of the kelly 7 to rotate the drill pipe. The kelly 7 is provided with an enlarged coupling end 9 through the medium of which it is detachably connected with the uppermost stand of the drill pipe.

The means embodying my invention for driving the kelly 7 from the rotary table 3 includes a body member 10 adapted to be supported within the downwardly converging tapered section 11 of the master bushing 8 and having a non-circular drive flange 12 at its upper end adapted to fit within a correspondingly shaped opening 13 formed in the upper surface of the rotary table 3.

The body member 10 is provided with a central vertically extending opening 14 of a diameter sufficiently large to permit passage of the coupling end 9 therethrough as the kelly 7 is raised through the rotary machine 1.

In order to form a driving connection between the body member 10 and the kelly 7, I provide a driven member 15 formed of the two cooperating sections 16 and 17. These cooperating sections are provided with a non-circular opening 18 adapted to fit around the non-circular structure of the kelly 7 to prevent relative rotation but to permit relative longitudinal motion of the kelly 7 with relation to the rotary machine 1.

The two segments 16 and 17 are formed in their body engaging section 19 with a downwardly converging taper 20 adapted to fit a tapered seat 21 of the body 10. The relative tapers at 20 and 21 are such as to leave a clearance as indicated at 22 between the lower surfaces of the flange 23 of the driven member 15 and the upper surface 24 of the annular shoulder of the body member 10 when the driven member 15 is seated upon the tapered seat 21. This clearance may be in the neighborhood of $40/1000$ of an inch and is provided in order to permit the wedging of the driven member 15 upon the tapered seat 21 by a wedge means as will hereinafter be particularly described so that there may be imparted to the body member 10 and to the driven member 15 relative tension and compression which will in effect so unite these members as will form a single integral driving member operative to prevent relative movement or working due to the vibrations set up in the kelly 7 as a result of the drilling operation as the rotary machine 1 is operated to rotate the kelly 7.

In the particular size of structure illustrated, the clearance has been indicated as being in the neighborhood of $40/1000$ of an inch because this particular clearance has been found sufficient to impart the desired relative tension and compression to the members 10 and 15 by the wedging of the member 15 upon the seat 21 prior to the establishing of the metal to metal contact by the flange 23 engaging the surface 24 of the member 10. This wedging should be sufficient in all structures to avoid possibility of "working" between the members 15 and 10 under operating conditions.

In order to wedge the driven member 15 against the seat 21, there is provided a plurality of studs 25 threaded into the body 10 and adapted to pass through bores formed in the flange 23 of the driven member 15. Nuts 26, threaded to the studs 25, provide the means for creating the wedging of the driven member 15 along the seat 21 with the consequent expansion of the body 10 and contraction of the driven member 15.

In the assembly of the driven member embodying my invention, I prefer to form on the upper surface of the body 10 driving lugs 27 adapted to fit within keyways or slots 28 formed through the flange 23 of each segment 16 and 17.

The particular driving connection formed between the driven member 15 and the rotary table 3 may be of any suitable or desirable construction whereby the driven member 15 is driven directly from the rotary table 3 as, for example, is disclosed in the co-pending application of Forrest J. Young, Serial No. 201,349, filed April 11, 1938.

In order to prevent displacement of the body 10 when the kelly 7 is raised, a locking means may be provided which acts to retain the body 10 in position within the master bushing. One form of such locking means is herein illustrated as including a lock element 29 pivotally mounted on the body member 10 and having a projecting lug 30 adapted to underlie an abutment on the rotary table 3. The locking element 29 has an operating handle 31 and a spring-urged plunger pin 32 is mounted in the handle 31 for maintaining the lug 30 in either its locked or unlocked position.

The cylindrical extension 33 has, at the lower end of the integral body member, a relatively loose sliding fit within the cylindrical bore 34 on the master bushing 8. When the drive bushing is lowered as a unit into position on the rotary machine 1, the cylindrical extension 33 slides down the taper 11 of the master bushing 8 and enters the cylindrical bore 34 to center the drive bushing axially of the rotary table 3.

The kelly 7 extends through the drive bushing and rotary machine 1 during this operation. When the cylindrical extension or pilot 33 has brought the drive bushing and kelly into axial alignment, the table 3 is rotated through the required angular distance to bring the cooperating non-circular elements 12 and 13 into registry, whereupon the drive bushing drops into operative position.

Having fully described my invention, it is to be understood that I do not wish to be limited to the details herein set forth, but my invention is of the full scope of the appended claims.

I claim:

1. In a device for transmitting rotary motion from the table of a rotary machine to a kelly extending therethrough, the combination of an integral body having a central taper bore, a non-circular section on said body adapted to receive the driving torque of the rotary machine, a driven member split axially into a plurality of cooperating segments and having an external taper portion adapted to seat in said taper bore, a pair of spaced bolt means directly connecting each segment with the integral body and adapted to act in an axial direction to wedge said segments within said taper bore and maintain same in face to face contact, a driving lug operatively positioned between each pair of spaced bolt means on said segments, and means associated with said driven member whereby it may rotate the kelly.

2. In a Kelly drive device adapted to be driven by the table of a rotary machine, the combination of an integral body having a central conical bore, a non-circular section on said body adapted to receive the driving torque of said rotary machine, a driven member adapted to rotate the kelly and having an external taper portion adapted to seat in said conical bore, said driven member being split axially into two cooperating segments, a plurality of studs secured in said body member and projecting axially through apertures provided in said segments, nuts cooperating with said studs to wedge said segments together under lateral compression within said conical bore, walls defining a key-receiving opening on each of said segments, and drive keys fixed on said body extending into said openings.

3. In a Kelly drive device adapted to be driven by the table of a rotary machine, the combination of an integral body member adapted to be driven from and axially insertable into a non-circular recess in the table, the integral body member being provided with a central tapered bore, a driven member adapted to rotate the kelly and having an external taper portion adapted to seat in said tapered bore, said driven member having a radially projecting drive flange intermediate its extreme ends, said driven member being split axially into two cooperating segments, anchor studs secured in said body member and projecting axially through a pair of apertures provided in the drive flange of each of said segments, nuts threaded on said studs to wedge said segments into said tapered bore and maintain the same in face to face contact, a key receiving opening provided in the drive flange of each segment between its respective anchor studs, and drive keys fixed on said body extending into said openings.

4. In a Kelly drive device adapted to be driven by a rotary table, the combination of an integral body member adapted to be driven from and axially insertable into a driving recess in the table, the integral body member being provided with a central tapered bore, a driven member adapted to rotate the kelly and having an external tapered portion adapted to seat in the tapered bore, said driven member being split axially into two cooperating segments having complementary contact faces and said driven member having a radially projecting drive flange between its ends, anchor studs secured in said body member to project through apertures formed in the drive flange of each said segment, nuts threaded on said studs to draw said segments into the tapered bore of the body member to thereby hold said segments in face to face contact, and cooperating driving means carried by each of said segments and said body member whereby the segments are driven from the body member while maintained in face to face contact.

5. In a Kelly drive device adapted to be driven by the table of a rotary machine, the combination of an integral body member adapted to be driven from and axially insertable into a non-circular recess in the table, the integral body member having a central tapered bore, a driven member adapted to rotate the kelly and having an externally tapered portion adapted to seat in the tapered bore of the integral body member, said driven member being split axially to form two cooperating half segments having cooperating parallel contact faces, said driven member having a radially projecting drive flange between its ends, the drive flange being positioned along the length of the driven member a distance corresponding with the taper of the cooperating segments such that when the cooperating segments are positioned within the conical bore of the integral body member that the cooperating flange will be spaced from the integral body member, and wedge means carried by the upper surface of the body member adapted to fit through apertures formed in each half segment, and means secured to said wedge means for forcing the half section downwardly in the tapered bore of the integral body member into position where the contact faces of said half segments are in pressure contact, and cooperating drive means interconnected between the integral body member and each half segment.

JOHN D. SPALDING.

CERTIFICATE OF CORRECTION.

Patent No. 2,344,746.                                      March 21, 1944.

JOHN D. SPALDING.

It is hereby certified that the above numbered patent was erroneously issued to the inventor, said "SPALDING" whereas said patent should have been issued to --The National Supply Company, of Pittsburgh, Pennsylvania, a corporation of Pennsylvania--, as assignee of the entire interest in said invention, as shown by the record of assignments in this office; and that the said Letters Patent should be read with this correction therein that the same may conform to the record of the case in the Patent Office.

Signed and sealed this 23rd day of May, A. D. 1944.

Leslie Frazer

(Seal)                                             Acting Commissioner of Patents.